Nov. 18, 1952      C. W. BRYANT      2,618,366
PNEUMATIC CLUTCH
Filed March 22, 1950      2 SHEETS—SHEET 1
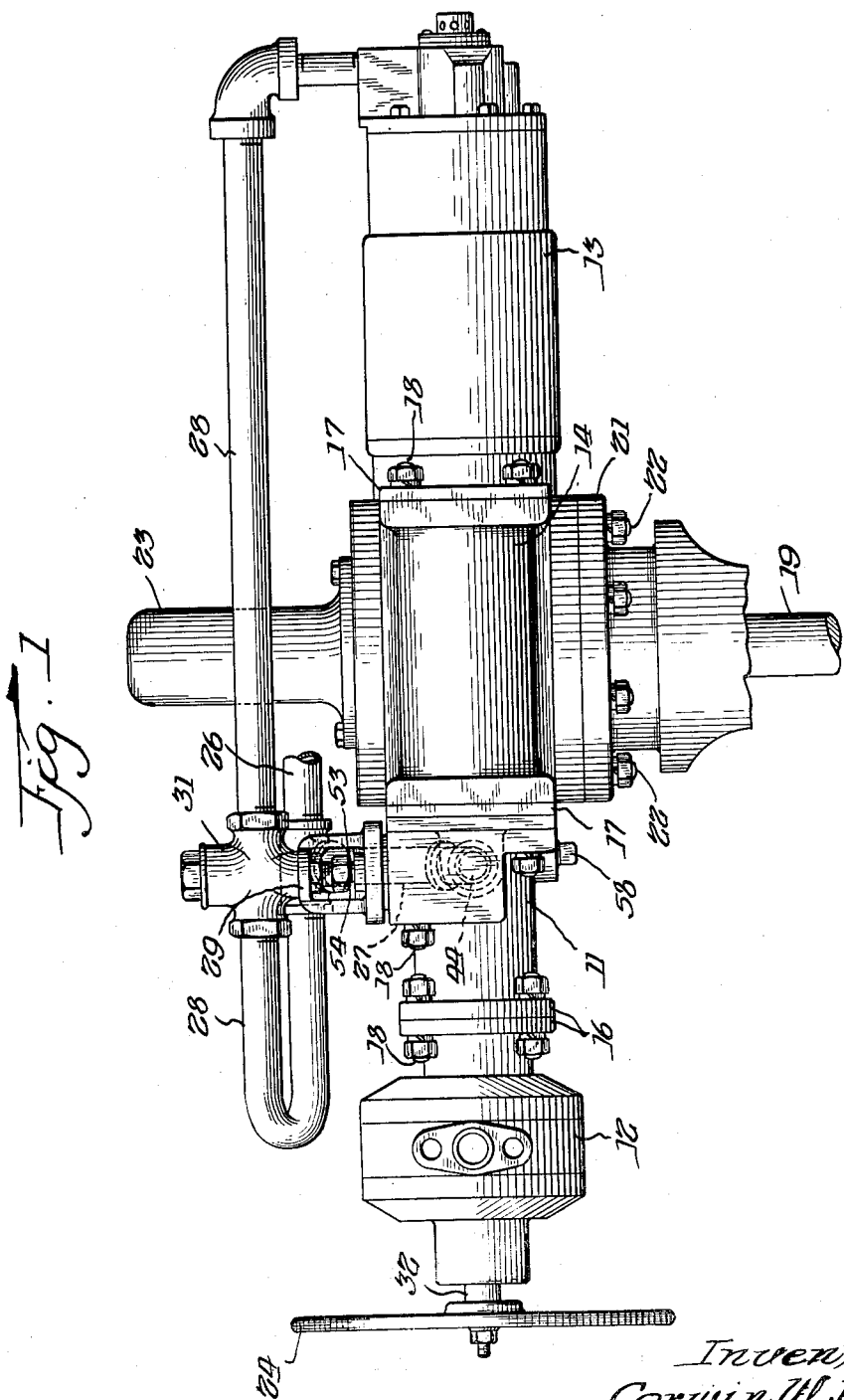
Inventor:
Corwin W. Bryant.
By Joseph O. Lang Atty.

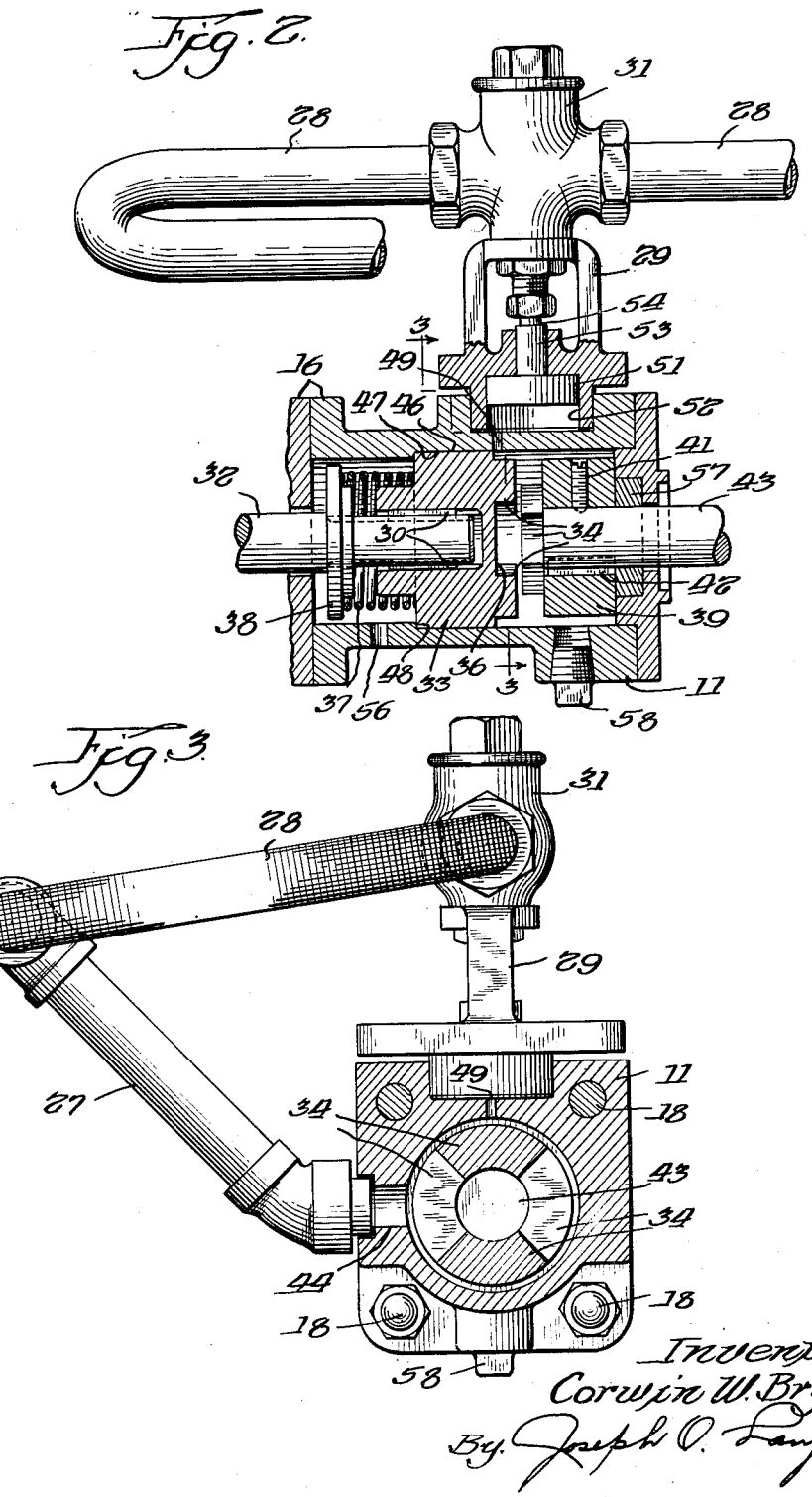

Patented Nov. 18, 1952

2,618,366

UNITED STATES PATENT OFFICE 2,618,366

PNEUMATIC CLUTCH

Corwin W. Bryant, Downers Grove, Ill., assignor to Crane Co., Chicago, Ill., a corporation Application March 22, 1950, Serial No. 151,293

6 Claims. (Cl. 192—.096)

This invention pertains to a valve actuating mechanism and, more particularly, to a novel arrangement employing dual power motor operation with a single clutch and drive shaft.

One of the more important objects is to provide for a construction in which one of the motors may be in a normally operating clutch engaged position, while integral within the unit, a pneumatic power motor may be available for emergency use in the operation of the valve, or other suitable apparatus designed to operate off a drive shaft.

Another object of this invention is to provide a structure of a pneumatic cylinder clutch in which the clutch is disengaged by the injection of air into the clutch casing.

A further object of this invention is to provide a drive structure having a dual power motor unit with an automatic declutching arrangement to start the operation of one of the motors while stopping the use of the other, all with but a single operation.

Another object is to provide a structure which contains an emergency high speed control motor suitably connected to a normally operating power motor so that either of the motors may be operated through a single clutch and shaft.

Still another object of this invention is to provide a dual power motor unit which is compact, eliminating the usual linkages, forks, and other connections by having a clutch function as a piston in a pneumatic power cylinder, thereby possessing the advantage of disengaging one motor and driving the other from one compressed air supply.

Other objects and advantages will become readily apparent upon proceeding with the following description read in connection with the accompanying drawings, in which Fig. 1 is an exterior front view of a preferred embodiment of the invention showing the dual motor and clutch assembly mounted on a single shaft.

Fig. 2 is a fragmentary sectional view of a portion of the assembly shown in Fig. 1.

Fig. 3 is a transverse sectional view of the structure taken approximately on the line 3—3 of Fig. 2.

Similar reference numerals refer to similar parts throughout the several views.

Referring now to Fig. 1, a clutch casing 11 is interposed between a fluid motor 12 or the like, on one end of a rotating drive shaft (see Fig. 2), and with a pneumatic motor 13 on the other end of the shaft. A gear housing 14 is intermediately mounted on the said drive shaft; thus, it is apparent that all the aforementioned units are located on a single drive shaft. Suitable flanges 16 and end plates 17 join the gear housing 14 to the fluid motor 12 and pneumatic motor 13, respectively, by means of the stud bolts 18, as shown. The gear housing 14 is included in the structure where a drive shaft normal to that of the original drive shaft is desired to be used. In the latter case, a conventional worm gear and wheel (not shown) are used to transmit the power to a shaft 19, such as that shown extending below the gear housing and which may be used in the operation of a valve (not shown). If valve operation is desired, a cover 21 is preferably connected to the bottom of the gear housing 14 by the bolts 22, which cover, if desired, may be made integral with the said valve. A valve stem casing 23 is mounted on top of the gear housing 14 in a manner suitable to receive a rising valve stem. A handwheel 24 is mounted on either end of the drive shaft for manual rotation of the latter.

As shown in Figs. 1 and 3, an emergency compressed air inlet pipe 26 is located above the clutch casing 11 through which pipe the compressed air supply is directed to the system. From this inlet joint 26, one pipe 27 leads into the side of the clutch casing, and another pipe 28 leads into a conventional quick-opening and self-closing globe valve 31 mounted immediately above the clutch casing 11 and secured thereto by a valve operator 29 which is attached to the said casing 11 and is held by a plurality of bolts (not shown). The globe valve 31 referred to may be the catalogue No. 12½ valve shown in Crane Co. catalog No. 49 on page 54. The compressed air pipe 28 also extends from the outlet of the globe valve 31 to the pneumatic motor 13.

The essence of this invention will be understood by reference to the preferred embodiment shown in Fig. 2. Normal function of the mechanism involves the operation of the fluid motor 12 driving a shaft 32 which extends into the clutch casing 11. A circular dog clutch 33, having two diametrically oppositely disposed jaws 34 on the face 36 thereof (see Fig. 3), is relatively loosely keyed by keys 30 to the shaft 32 within the clutch casing 11 to allow for predetermined axial movement of the clutch 33. The opposite end of the dog clutch 33 is yieldingly urged forward by means of a compression coil spring 37 or the like which encircles the shaft 32 and is positioned intermediate of the clutch 33 and a spring collar 38 mounted on the shaft 32 to give the spring 37 desired support. Thus, it will be seen that the dog clutch 33 is moved forward, under the influence of the coil spring 37, until it meshes with a cooperating similarly shaped dog clutch 39 which, however, does not have axial movement. The latter dog clutch 39 axially secured by a set screw 41, transmits the rotation of the shaft 32 from the fluid motor 12 through a key 42 to a shaft 43 extending beyond the gear housing 14 and into the pneumatic motor 13.

By means of the emergency air inlet 44, located in front of the face 36 of the axially slidable dog clutch 33 and through the side of the relatively air-tight clutch casing 11, compressed air is admitted from a supply which declutches the fluid motor 12 and operates the pneumatic motor 13 in a manner hereinafter described. Compressed air from the pipe line 26 enters the clutch casing 11 forcing the axially slidable dog clutch 33 backward. It will be noted that the latter member has a tight fit between a forward portion 46 of its outer periphery and the adjoining inner periphery 47 of the clutch casing 11; thus, the two act as a piston and cylinder. If necessary, a piston ring (not shown) may be used on the slidable dog clutch 33 to insure a sufficient air seal. The backward movement of the dog clutch 33 is stopped by an inner annular casing shoulder 48, but the axial movement provided is sufficient to allow the clutch 33 to disengage the fluid motor drive.

The compressed air in clutch casing 11 escapes through a port 49 in the top of the clutch casing 11, the said port 49 being so located that it is covered by the clutch 33 until the said clutch 33 has moved to disengage as described above. The quick-opening valve operator 29, mounted over the port 49, receives the air, the force of which is directed upwardly against the piston 51 carried within the casing of the valve operator 29. The axial movement of the piston 51 is stopped by the end limits of the operator cylinder 52, but the displacement is sufficient to allow a piston shank 53, projecting upwardly through the wall of the cylinder 52, to strike the valve stem 54 of the quick-opening valve 31 mounted above the valve operator 29. Thus, the quick-opening valve 31 is opened to permit the passage of compressed air from the air supply and through the valve pipe 28, through the valve 31 and outlet pipe 28 to drive the pneumatic motor 13.

The valve operator 29 may be replaced by a linkage system, operated from or through the sliding dog clutch 33, to open the quick-opening valve 31, although such a method is not as desirable as the preferred form herein shown.

When the air supply is shut off, the air trapped between the valve 31 and the pneumatic motor 13 may be released through a small hole in the valve disc (not shown), and any air trapped within the clutch casing 11 will also be exhausted out through the clutch pipe line 27.

The clutch casing 11 also contains an air vent 56 behind the movable dog clutch 33, thereby to maintain atmospheric pressure in that portion of the casing 11. A fluid seal, such as the oil seal 57, behind the fixed dog clutch 39 and around the shaft 43 provides the necessary air-tight seal at this point in the clutch casing 11. A threaded drain plug 58 screwed into the bottom of the casing 11 permits draining of the excess oil.

Thus, it will be clear that there has here been discovered a simple, novel, and compact assembly for dual power motor operation capable of easy assembly with a valve or other device.

Thus, it should be understood that this invention is not limited to the precise embodiment as hereinbefore described, but it is susceptible to numerous changes without departing from the spirit thereof or the scope of the appended claims.

I claim:

1. An automatic declutching dual motor operator device, comprising a motor, a shaft therefor, an axially slidable clutch member loosely mounted on the shaft of the said motor, means for yieldingly moving the said clutch member axially, a substantially air-tight clutch casing having an inner periphery functioning as a cylinder for the said clutch member, a second clutch member cooperating with the said axially movable clutch member, a shaft therefor, a pneumatic motor mounted on the shaft of the said second-named clutch member, the said clutch casing having a transverse port which is opened upon predetermined axial movement of the said slidable clutch member, a valve operating means communicating with the port of the said clutch casing including a piston cooperating with the said valve operating means, a quick opening valve having an inlet, a stem on the said latter valve, the said piston having connecting means cooperating with the said stem to open the said quick-opening valve, air supply means having means for jointly injecting air into the said clutch casing and into the inlet of the said quick-opening valve and actuate the said pneumatic motor.

2. A pneumatically operated clutch arrangement comprising a motor, a shaft therefor, a substantially fluid-tight clutch casing having an air port, a clutch member axially slidable on the said motor shaft and non-rotatable relative thereto, the said clutch member being snugly fitted within the said casing to act as a piston along an interior wall portion of the said casing, a second clutch member cooperating with the said slidable clutch member, means cooperating with the latter member for normally holding the said clutch members in engagement, a second shaft aligned with first-named shaft for mounting of said second clutch member, a pneumatic motor mounted on said second shaft, valve actuating means mounted over the said clutch casing air port, the latter being open only when the said clutch members are disengaged, a piston carried by the said valve actuating means, a valve cooperating with the movement of the said piston, air supply means for injecting air into the said clutch casing thereby to disengage the said clutch members and actuate the said valve to allow the entry of air to actuate the said pneumatic motor.

3. An automatic declutching dual motor drive, the combination comprising a motor, a shaft extending from the said motor, a combination clutch and piston member slidably mounted for axial movement on the said shaft, a clutch member cooperating with the said motor and having a shaft extending therefrom, a pneumatic motor mounted on the latter mentioned shaft, resilient means on the said clutch-piston member for engaging the said clutch members, a substantially fluid-tight clutch casing having an air inlet and an air port, the said port being open only when the said clutch members are disengaged, fluid actuated valve operating means communicating with the said clutch casing air port, valve means connected to cooperate with the said valve operating means, fluid supply means communicating with the casing air inlet to inject air into the said clutch casing thereby to disengage the said clutch members, the same fluid means actuating the said valve means to flow through the said valve means to operate the said pneumatic motor.

4. A dual motor pneumatic clutch device comprising in combination a motor having a drive shaft connected therewith, a driving clutch member slidably mounted on the end of the said drive shaft, an oppositely disposed axially aligned shaft, a driven clutch member on said latter shaft arranged to cooperate with the said driving clutch member, resilient means for urging the said driving clutch member forward to engage with the said driven clutch member, fluid means to move one of the clutch members axially in a direction away from said driven clutch member, pneumatic valve operating mechanism mounted with means to cooperate with the said fluid means, valve means connected to the said valve operating mechanism and the said fluid means to effect said clutch disengagement, a pneumatic motor mounted on the said shaft with the driven clutch member, the latter motor being operated by fluid passing through the said valve means.

5. The combination in an automatic declutching dual motor device comprising a motor with a drive shaft, a reciprocably movable driving clutch member loosely keyed to the said drive shaft to permit axial displacement without relative rotation, a driven clutch member having means to engage the said reciprocable driving clutch member, a shaft for mounting the said latter clutch member, means for yieldingly urging the said clutch members into engagement, a pneumatic motor mounted on said shaft with the said driven clutch member, a substantially air-tight clutch casing having a portion thereof snugly fitting the said driving clutch member whereby to act as a cylinder to receive a peripheral portion of the said driven clutch, the said casing having air inlet and outlet openings, externally controlled fluid conduit means communicating with the said clutch casing and the said pneumatic motor.

6. A combination pneumatic clutch control device and pneumatic motor operator comprising in combination a reciprocably movable combined clutch and piston member, a motor and a shaft therefor, a second shaft axially aligned with said motor shaft, an axially fixed clutch member on said second shaft, means integral with the said clutch members for transmitting predeterminedly rotative motion between the said shafts, spring means for urging the clutch members into axial engagement, driving means mounted on the shaft extending from the said clutch members, the said latter means including a pneumatic motor at one end of a shaft, a casing enclosing the said clutch members having a portion thereof snugly engaging the piston portion of the said combined clutch and piston member, the said casing having fluid inlet and outlet openings, fluid means effecting the axial movement of the said clutch members to operate the said pneumatic motor.

CORWIN W. BRYANT.

REFERENCES CITED

The following references are of record in the file of this patent:

UNITED STATES PATENTS

| Number | Name | Date |
| --- | --- | --- |
| 2,340,999 | Trott | Feb. 8, 1944 |
| 2,352,140 | Trott | June 20, 1944 |